United States Patent
Angland

(10) Patent No.: US 6,789,792 B1
(45) Date of Patent: Sep. 14, 2004

(54) FOLDING CUTTING BOARD

(76) Inventor: Clair Angland, 19233 Viking Bay Rd., Parker's Prairie, MN (US) 56361

( * ) Notice: Subject to any disclaimer, the term of this patent is extended or adjusted under 35 U.S.C. 154(b) by 0 days.

(21) Appl. No.: 10/426,528

(22) Filed: Apr. 29, 2003

Related U.S. Application Data

(60) Provisional application No. 60/376,280, filed on Apr. 29, 2002.

(51) Int. Cl.$^7$ ................................. B23Q 3/00
(52) U.S. Cl. .................. 269/289 R; 269/302.1
(58) Field of Search .................. 269/289 R, 302.1, 269/13, 303, 315

(56) References Cited

U.S. PATENT DOCUMENTS

| | | | | |
|---|---|---|---|---|
| 5,203,548 A | * | 4/1993 | Sanders | 269/302.1 |
| 5,382,009 A | * | 1/1995 | Mertz et al. | 269/16 |
| 6,422,551 B1 | * | 7/2002 | Brotz | 269/289 R |
| 6,460,841 B1 | * | 10/2002 | Durr | 269/289 R |

* cited by examiner

Primary Examiner—Lee D. Wilson
(74) Attorney, Agent, or Firm—Albert W. Watkins

(57) ABSTRACT

A folding cutting board has a contiguous cutting surface, and an opposed surface subtended by four distinct and generally parallel grooves. The grooves form five body members, four which have approximately equal surface area and one which has a width approximately equal to twice the thickness of the substrate. With this relationship, the cutting board may be folded into a compact and durable structure for transport which requires only one quarter the surface area, and which still provides the solid, non-porous and uninterrupted surface for cutting or working. Special hinges are also illustrated herein having a smooth curve within the region of flexure which prevents undesired concentration of stress. In adjacent and relatively non-pliant regions, a second geometry is superimposed which serves to clear away obstacles, including fingers, from the hinge region during movement therein. Consequently, the hinge structure is a "no pinch" hinge. The preferred cutting board is manufactured from polyethylene or polypropylene, both which offer outstanding stain resistance, repeated flexure, and food grade usage, though other materials are contemplated herein.

20 Claims, 2 Drawing Sheets

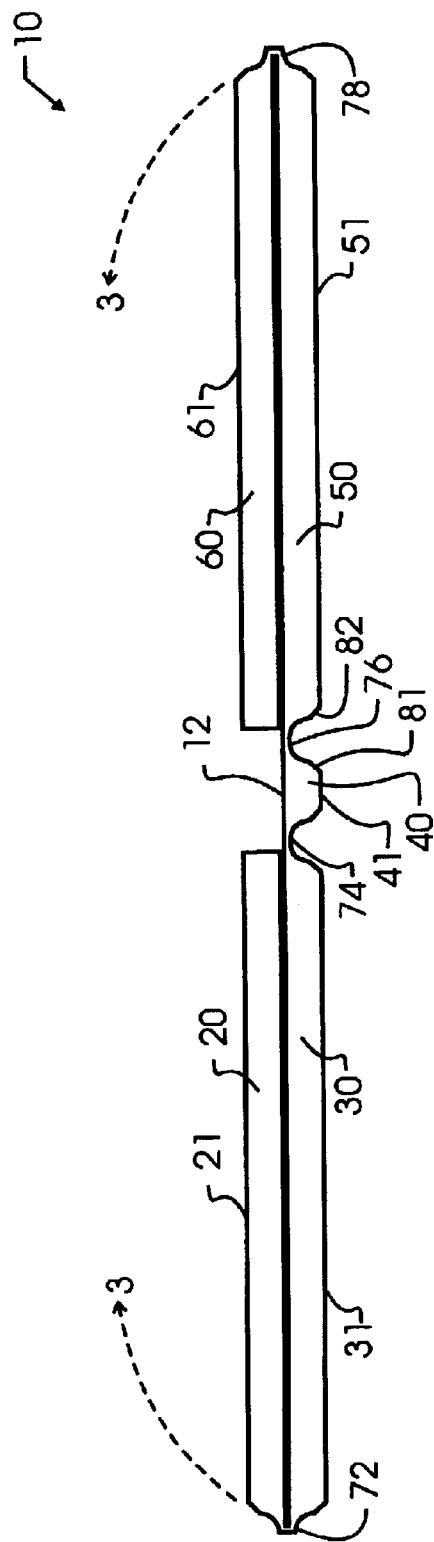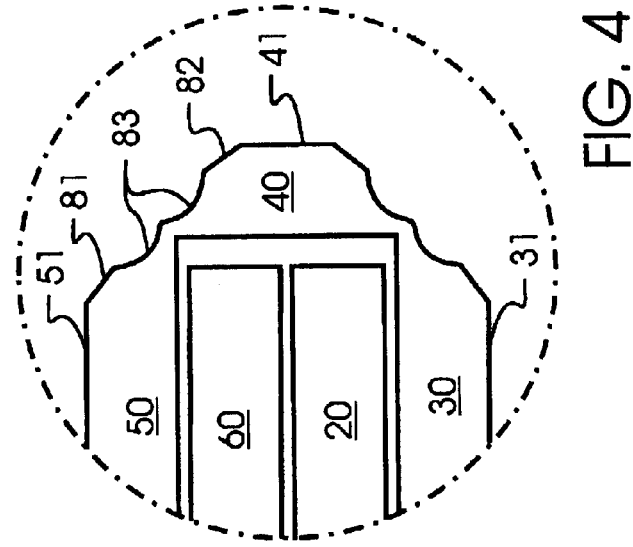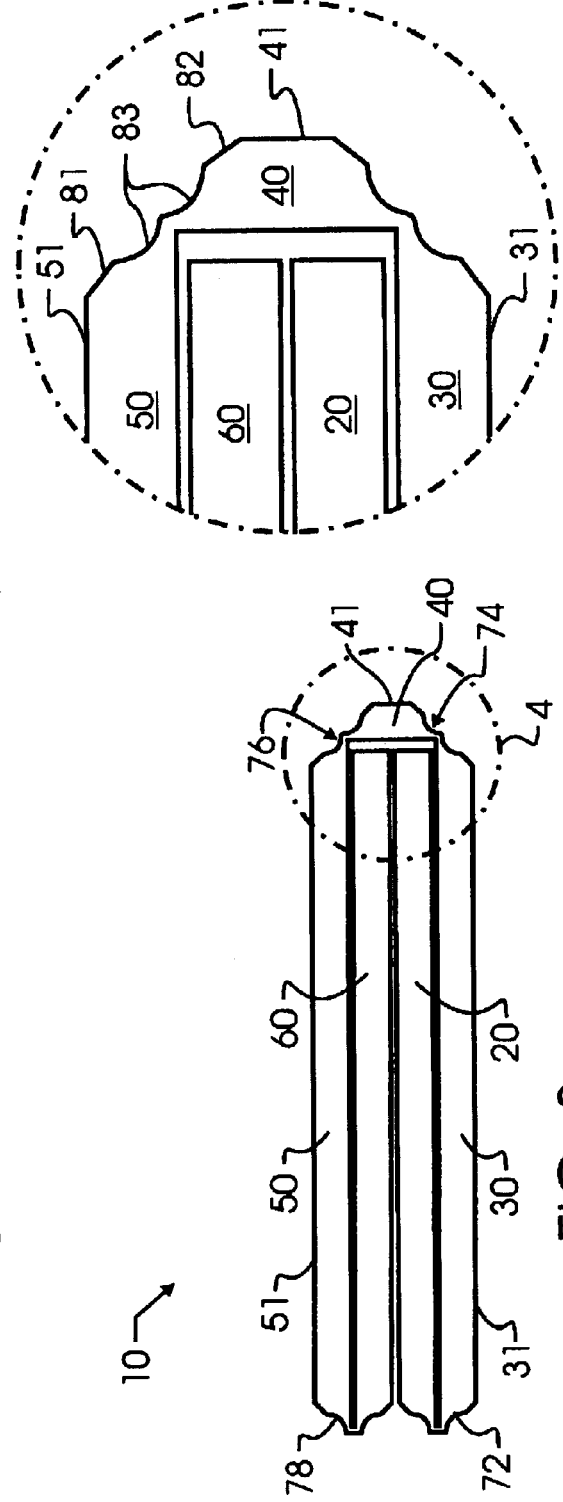

FOLDING CUTTING BOARD

CROSS REFERENCE TO RELATED APPLICATIONS

This application claims priority to U.S. provisional application Ser. No. 60/376,280 filed Apr. 29, 2002, the contents which are incorporated herein by reference in entirety.

BACKGROUND OF THE INVENTION

1. Field of the Invention

This invention pertains generally to the fields of work holders and butchering, and more specifically to cutting boards that may be used as underlying supports during the preparation of food or crafts.

2. Description of the Related Art

Cutting boards have been in use for nearly as long as man has been civilized. The utility of a cutting board is derived from a need to cut various objects while simultaneously preserving the cutting edge of knives or blades. In the specific case of the culinary arts, the chef will also aspire to prepare foods in a clean and sanitary way.

Directly cutting objects upon a hard support which resists damage from a knife is known to unduly dull the knife when the object is severed. Dulled cutlery requires additional force when severing work, and may lead to dangerous slipping and injury. Yet maintaining the cutlery in a sharp state requires substantial sharpening time, and, when the cutlery is repeatedly dulled by the work support, the repeated sharpening also leads to undesired wear of the cutlery. However, cutting without a board or other suitable work surface results in unrestrained movement of the cutting blade upon severing of the food, which may lead to injury. Furthermore, without a suitable support, foods may be contaminated by unsterile surfaces. A similar issue arises with the use of a porous work support surface. The porous surface will trap food juices therein, potentially contaminating the work surface and harboring dangerous pathogens.

In a modern usehold, the cutting board will allow a person to prepare food quickly by slicing a diverse variety of foods, spices and other food ingredients without fear of permanently damaging either the work areas, typically counters and the like, or damaging the cutlery. With an appropriate cutting board, the cook may simply press hard enough to ensure that the food is completely sliced, without regard for what might occur with the knife after the food has been severed. Outside of the kitchen, but still within a dwelling, there are many times when a person requires the use of a sharp blade such as a razor blade, Exacto-Knife or other tool for cutting various substrates. In these instances, the same concerns regarding the cutlery and work surfaces exist, where the working knife must, to perform the intended function, pierce through the material being cut. As a consequence, it is impossible for a person to stop short of cutting all the way through the substrate and still obtain the desired result. Consequently, there must be contact between the knife and the underlying work support. Where this work support is furniture or the like, the knife will cause harm and damage that may be irreparable.

In the outdoors or in areas less furnished, there may not be a ready work surface. In such instances, it is highly desired to provide a way to prepare food without risking contamination of the food with dirt, earth or the like. Similarly, the knife will also most desirably be protected from damage.

In the prior art, in order to achieve the important goals of protecting the knife while providing a severing surface, and to simultaneously avoid harboring dangerous pathogens, many cutting boards have been fabricated from wood. In particular, closed grain or minimally-grained woods tend to be preferred, such as maple, in the fabrication of cutting boards. This is because most wood species have very little damaging effect on the sharpness of a knife edge during engagement therewith, and closed-grain species provide a relatively non-porous and safe surface for working upon. To prevent liquids from penetrating the wood and forming a hazardous surface, a food oil such as vegetable oil is commonly applied to the wood and permitted to soak into the pores or openings therein. As is known, the oil prevents water-based liquids from penetrating therein, while simultaneously providing a relatively mild, oiled surface against which the knife blade will be pressed. This oiled wood surface provides very minimal wearing of the knife blade or wooden surface, and yet may be readily cleaned or washed after use.

These traditional wooden cutting surfaces have been the standard used in kitchens for many years. However, the wooden surface requires proper cleaning and oiling to ensure safe usage over time. To have utility with different projects and types of work, the cutting board must be reasonably large to adequately support the various work. In a large kitchen area, this normally does not present a problem, since there is usually a space where the cutting board may either be supported on edge or otherwise stored. In fact, many modern kitchens include a pull-out cutting board immediately below the counter-top. However, it will be apparent that the surface area of the cutting board and, relative to surface area, thinness of the board, does not lend the board to be readily transported, nor for storage in smaller spaces or places. Not only does the traditional thin and flat cutting board suffer from an inconvenient size, the board must either be manufactured excessively thick to have adequate strength to avoid breakage, or may instead be excessively heavy. Yet, there are many times where a person would benefit from the availability of the cutting board.

SUMMARY OF THE INVENTION

In a first manifestation, the invention is a folding cutting board which may be collapsed into a compact and rigid structure for storage and transport, and which has a smooth, contiguous, non-porous surface when in a fully opened position. The cutting board comprises at least two body members, each having a first contiguous generally planar cutting surface and a second base surface and a thickness therebetween. A hinging member has a minimum hinge thickness defining a longitudinal hinge axis and forming a smoothly curving arch in a cross-section transverse to the longitudinal hinge axis, for separating and enabling relative rotation between the at least two body members. The hinging member develops stresses responsive to relative rotation between the at least two body members that are distributed gradually throughout the smoothly curving arch.

In a second manifestation, the invention is a work support surface which is simultaneously folding and yet which provides a smooth and contiguous surface. A contiguous sheet of polymeric material forms a first working surface and a second hinging surface, the two separated from each other by a thickness of the contiguous sheet. First, second, third and fourth grooves are cut into the hinging surface and subtend the contiguous sheet into first, second, third and fourth body members of relatively flat and planar geometry, each having equal surface area on the second hinging surface.

The second and third grooves further subtend the second hinging surface into a fifth body member having a surface length approximately equal to the length of the second and third grooves and a surface width approximately equal to twice the thickness of the contiguous sheet.

In a third manifestation, the invention is a method of constructing, using and closing a cutting board having at least four body sections, each of the at least four body sections having a work supporting surface upon which cutting may operatively be performed. According to the method, a first one of the at least four body section work supporting surfaces is folded from a position generally coplanar with a second one of the at least four body section work supporting surfaces to a position immediately adjacent to the second one of the at least four body section work supporting surfaces. A fourth one of the at least four body section supporting surfaces is rotated from a position generally coplanar with a third one of the at least four body section work supporting surfaces to a position immediately adjacent the third one of the at least four body section work supporting surfaces and spaced from the first body section by an amount approximately equal to the sum of a thickness of the first one of the at least four body sections and a thickness of the fourth one of the at least four body sections. The second one of the at least four body section work supporting surfaces is pivoted from a position generally coplanar with the third one of the at least four body section work supporting surfaces to a position parallel to and spaced from the third one of the at least four body section work supporting surfaces while maintaining the first one of the at least four body section work supporting surfaces adjacent the second one of the at least four body section work supporting surfaces and the fourth one of the at least four body section work supporting surfaces adjacent the third one of the at least four body section work supporting surfaces, the second one of the at least four body section work supporting surfaces separated from the third one of the at least four body section work supporting surface by the first and fourth ones of the at least four body sections.

OBJECTS OF THE INVENTION

Exemplary embodiments of the present invention solve inadequacies of the prior art by providing a knife-friendly, folding cutting board which uses a no-pinch and distributed stress hinge and which also uses a polymeric material which is less dense than water.

A first object of the invention is to provide a support for work, foods, ingredients or any other material or compound which is structurally sound, contiguous, less dense than water, and non-porous. A second object of the invention is to provide such a work support which has a surface that is non-damaging to a cutting blade. Another object of the present invention is to enable folding of a cutting board for compact storage and durability during transport. Most preferably, the cutting board will fold with cutting surfaces in contact with other cutting surfaces. A further object of the invention is to ensure that, during folding, the hinge region is non-pinching, thereby preventing the hinge region from either trapping foreign objects or pinching fingers or the like. Yet another object of the present invention is to provide such a hinge which is free from concentrated stresses during flexure which would otherwise significantly reduce the life of the hinge.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 2 illustrates the preferred embodiment cutting board of FIG. 1 from side plan view in a partially folded position.

FIG. 3 illustrates the preferred embodiment cutting board of FIG. 1 from side plan view in a completely folded position.

FIG. 4 illustrates an enlarged view of the center hinges of the preferred embodiment cutting board shown in FIG. 3 taken within the region identified by section line 4.

DESCRIPTION OF THE PREFERRED EMBODIMENT

Figure 1:
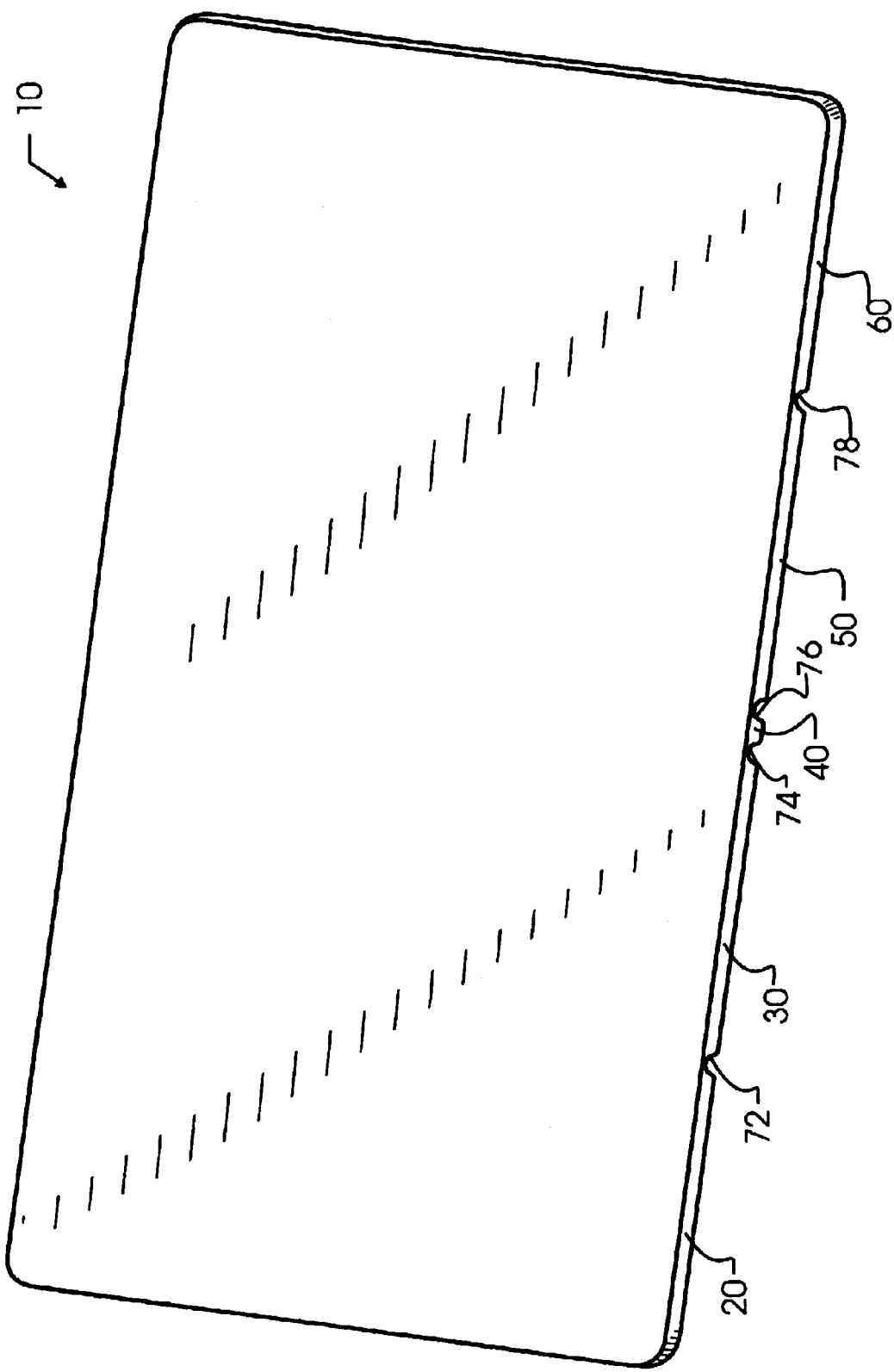
FIG. 1 illustrates a preferred embodiment cutting board designed in accord with the teachings of the present invention in operative position from projected plan view.

Manifested in the preferred embodiment folding cutting board 10, the present invention provides a smooth and contiguous, uninterrupted and non-porous work surface 12. For the purposes of this disclosure, it will be understood that the description of work surface 12 being smooth is based upon a macroscopic view, and that minor surface variations and irregularities such as knife marks and indentations, texturing, and other similar surface imperfections or adornments which are known to be used or formed as a consequence of use in the art of cutting boards will be understood to be included herein. The substrate which provides the work surface is subtended by a plurality of generally parallel grooves 72–78 which permit the substrate to be compactly folded while preserving the most desirable benefits associated with a cutting board. More particularly, a number of factors are identified herein by the present inventor that are considered to be consequential and illustrative of the utility of cutting board 10, though it will be understood that these factors are illustrative only and not limiting. Among the important factors are softness relative to knife steel while simultaneously presenting resistance to severing under the forces of a knife, lack of porosity and lack of entrainment of foreign matter, strength of the board, compactness, ease of cleaning, and ease of transport. To attain this combination of features, preferred embodiment folding cutting board 10 is preferably manufactured from a polymeric material. While a number of materials will be suited for the present application, in the most preferred embodiment folding cutting board 10, polyethylene and polypropylene are the materials of choice. These polymers offer a combination of pliability and durability, together with relative lubricity when engaged with knife steel. While both are relatively soft compared to knife steel, the lubricity and nature of the materials make them quite cut resistant and therefore ideally suited for the present application. In addition, polyethylene and polypropylene are available which are slightly less dense than water, and which will therefore float.

At first, the ability to float may seem to be of only passing interest. However, there are many outdoor applications for the present invention, and when the material is of similar or lower density than that of water, folding cutting board 10 may be dropped or suspended in a body of water, such as along a lake shore or stream bank, without loss. Consequently, the cleaning of folding cutting board 10 in those applications will be simplified. Further, in the event folding cutting board 10 is dropped through mishap into a water body, it will be easily recovered.

While there are other materials that are also known to have the particular combination of preferred features, polyethylene and polypropylene are also food grade materials, allowing use and direct contact with all types of food during preparation prior to human consumption. Few materials meet the relatively strict requirements for food preparation, and even fewer have the necessary physical characteristics required by the present invention. Polypropylene and polyethylene are available in different forms, including various molecular weight variants such as high density polyethylene, ultra-high molecular weight polyethylene, low molecular weight polyethylene, branched polyethylene and the like. Each are contemplated herein, as are other materials, polymer or otherwise, that provide the requisite characteristics for a particular intended application, as will be apparent to those skilled in the art after a review of the present application. In addition, the invention is not solely limited to the use of a single material, but may be formed from chemical blends, mechanically disparate processing or other suitable technique. Exemplary of the concept outlined here, but not limited solely thereto, is the use of a co-extrusion, wherein the materials used for the work surface 12 may be fabricated from a relatively more durable material, while a section of more pliable material is co-extruded in the hinge region to form pliable hinges.

Grooves 72–78 subtend the substrate into five discrete body members 20, 30, 40, 50, and 60. Each of these five body members 20, 30, 40, 50, and 60 have, in the unfolded position of FIG. 1, a co-planar cutting surface that each forms an integral part of work surface 12. However, each of these discrete body members 20, 30, 40, 50, and 60 also has a second surface 21, 31, 41, 51, and 61, respectively, that, in the most preferred embodiment configuration of FIG. 1 is parallel to contiguous work surface 12. While there is not requirement that these surfaces 21, 31, 41, 51, and 61 be parallel, in the most preferred embodiment this permits folding cutting board 10 to be laid upon a flat surface and to still maintain work surface 12 in a planar configuration. Where folding cutting board 10 is to be designed for a custom surface or application, it is contemplated herein that surfaces 21, 31, 41, 51, and 61 may not all be co-planar.

FIGS. 2 and 3 illustrate folding cutting board 10 of FIG. 1 in progressively more compact position with FIG. 2 showing body members 20 and 60 folded inward towards body member 40. Folding cutting board 10 may be further folded from the position shown in FIG. 2 as illustrated therein by lines 3 bringing hinges 72 and 78 adjacent one another, into the position shown in FIG. 3. In this position, it will be apparent that body members 20, 30, 50 and 60 are stacked into a single structure four times as thick as shown in FIG. 1, but also requiring only one quarter of the surface area for storage. This is achieved in the most preferred embodiment folding cutting board 10 without contacting contiguous work surface 12 with any of the second surfaces 21, 31, 41, 51, and 61, thereby avoiding the potential for contamination either from or to contiguous work surface 12. For example, where folding cutting board 10 is to be used out of doors, on the ground for instance, it is most preferable to avoid placing any of the ground contacting surfaces 21, 31, 41, 51, and 61 into contact with contiguous work surface 12. On the other hand, when folding cutting board 10 is used in butchering or during other meat preparation in a kitchen, it may be undesirable to allow contaminated contiguous work surface 12 to contact any of the second surfaces 21, 31, 41, 51, and 61, which might then transfer to a person or to a counter top. Consequently, the preferred folding illustrated in the figures serves to better isolate the contiguous work surface 12 from second surfaces 21, 31, 41, 51, and 61.

In the most preferred embodiment, as shown in FIG. 2, at this stage of the folding method there is still a small gap between body members 20 and 60 which is approximately equal to the thickness of members 20 and 60 between contiguous work surface 12 and second surfaces 21 and 61. While the exact thickness is not critical, the spacing must approximate the aforementioned members, and will most preferably provide a small amount of excess clearance. When this spacing between grooves 74 and 76 is too small, folding cutting board 10 will be prevented from completing the fold illustrated by lines 3 in FIG. 2, owing to interference between body members 20 and 60. In the event this gap is too great, hinges 74 and 76 may be exposed to excessive forces when folding cutting board 10 is in the position illustrated in FIGS. 3 and 4. This is because any forces that would tend to press body member 50 toward body member 30, such as might occur when folding cutting board 10 is transported within a person's back pocket and they sit down, would most preferably be transmitted directly through body members 20 and 60. However, if the spacing between grooves 74 and 76 is too great, the forces will instead be placed upon these grooves, which may lead to premature and undesirable destruction of the grooves.

FIG. 4 illustrates grooves 74 and 76 in much greater detail and in the folded configuration, though for ease of illustration and discussion, only the various components 81–83 of groove 76 have been separately numbered. Corresponding numbering has been provided in FIG. 2, to illustrate groove 76 when opposing a flat portion of contiguous surface 12. As can be seen in FIG. 2, groove 76 has a generally smooth and continuous arch 83 which takes on a cross-sectional geometry resembling that of an inverted U-shape. By designing each of the grooves 72–78 to have this U-shaped cross-section when folding cutting board 10 is in an open and operative configuration, stresses are better distributed throughout the region of smooth and continuous arch 83 during flexure of the groove region. Prior art V-grooves tend to very strongly concentrate stresses at the discontinuous point of the V, which represents a mathematical discontinuity in the curve function, and which leads to rapid fatigue and failure of the hinging characteristic of the present grooves 72–78. For the purposes of the present disclosure, it will be understood that points of mathematical discontinuity within the curves, and particularly those of sudden slope changes, will be recognized as generating substantial stress concentration during flexure of the groove structure, and the grooves will consequently fail much earlier than a geometry lacking discontinuity, or, as referred to herein, grooves having a smooth and continuous curve. Smooth and continuous curves are illustrated, for example, by grooves 74, 76 in FIG. 2.

An additional feature is most preferably found in the preferred groove structure of the preferred embodiment folding cutting board 10. As best visible in FIG. 4, adjacent the opening of the U-shape in groove 83, additional material will most preferably be removed from the surrounding body material. In the most preferred embodiment folding cutting board 10, this is achieved at the time of design or manufacture by forming a V-groove superimposed upon the U-groove. The V-groove will not intersect with any part of folding cutting board 10 at the point of discontinuity in the V, but will serve to taper adjacent relatively non-pliant body members therefrom, serving to expand the open end of the U-shape. This expansion causes surfaces 81 and 82 to be formed, which will in turn engage with foreign substances or objects that enter within groove 76, presuming the foreign substance or matter is of sufficient dimension. As groove 76 is flexed from the position illustrated in FIG. 4 to the position shown in FIG. 2, the U-shape will tend to close.

However, surfaces 81, 82 will also be pushed against any such object and tend to drive the object out of the groove region defined by the U-shape. This results in a no-pinch hinge structure which is relatively free from either pinching a person or any other object, including undesirable matter upon which folding cutting board 10 may be resting.

In the most preferred embodiment folding cutting board 10, each of the grooves 72–78 extend altitudinally into the thickness of the substrate material, and extend longitudinally across the width of folding cutting board 10. At the apex of the arch formed by each groove 72–78, which defines the point of minimum thickness, the groove defines a longitudinal hinge axis. A cross-section taken transverse to this axis has the appearance of groove 76 in FIG. 2, which comprises a smoothly curving arch 83, which is generally an inverted U-shape, and a superimposed V-groove which serves to widen the open base of the inverted U-shape. While a V-groove is used in the preferred embodiment, those skilled in the art will recognize that other geometries could be used, including rounded corners or other arrangements which provide the no-pinch function of the preferred V-groove.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A folding cutting board which may be collapsed into a compact and rigid structure for storage and transport, and which has a smooth, contiguous, non-porous surface when in a fully opened position, comprising:
    at least two body members, each having a first contiguous generally planar cutting surface and a second base surface and a thickness therebetween; and
    a hinging member having a minimum hinge thickness defining a longitudinal hinge axis and forming a smoothly curving arch in a cross-section transverse to said longitudinal hinge axis between said first contiguous generally planar cutting surface and said second base surface, said hinging member separating and enabling relative rotation between said at least two body members;
    said hinging member developing stresses responsive to said relative rotation between said at least two body members that are distributed gradually throughout said smoothly curving arch.

2. The folding cutting board of claim 1, wherein said hinging member arch has a U-shaped cross-section.

3. The folding cutting board of claim 2 further comprising a V-shaped channel immediately adjacent said hinging member arch, thereby expanding said U-shaped cross-section at the open end thereof, whereby said hinging member is more resistant to pinching or trapping foreign objects during movement thereof than without said V-shaped channel.

4. The folding cutting board of claim 1, further comprising:
    third and fourth body members, each having a first contiguous generally planar cutting surface and a second base surface and a thickness therebetween;
    said third and fourth body members hingedly attached to said at least two body members and foldable therewith to in a first open and operative position place said third and fourth body member cutting surfaces co-planar with said at least two body member generally planar cutting surfaces and in a second folded configuration place said third and fourth body member planar cutting surfaces immediately adjacent to said at least two body member generally planar cutting surfaces and said third and fourth body member second base surfaces immediately adjacent to each other.

5. The folding cutting board of claim 4, further comprising second and third hinging members each having a minimum hinge thickness defining a longitudinal hinge axis and forming a smoothly curving arch in a cross-section transverse to said longitudinal hinge axis between said first contiguous generally planar cutting surface and said second base surface, said second and third hinging members operatively attaching said third and fourth body members to said at least two body members and enabling relative rotation therebetween.

6. The folding cutting board of claim 5, wherein said smoothly curving arches of second and third hinging members are U-shaped and each expand at the open cross-sectional edge of said U-shaped cross-section, whereby said second and third hinging members are more resistant to pinching or trapping foreign objects during movement thereof.

7. The folding cutting board of claim 6, wherein said folding cutting board comprises a contiguous sheet and said hinging member and said second and third hinging members each further comprise a groove cut into said second base surface, thereby leaving said first contiguous generally planar cutting surface undisturbed across said at least two body members and said third and fourth body members.

8. The folding cutting board of claim 7, wherein said contiguous sheet further comprises a non-porous polypropylene which is less dense than water.

9. The folding cutting board of claim 1, wherein said folding cutting board comprises a contiguous sheet and said hinging member comprises a groove cut into said second base surface, thereby leaving said first contiguous generally planar cutting surface undisturbed.

10. The folding cutting board of claim 1, wherein said at least two body member generally planar cutting surfaces are non-porous and said at least two body members are less dense than water.

11. A work support surface which is simultaneously folding and yet which provides a smooth and contiguous surface, comprising:
    a contiguous sheet of polymeric material having a first working surface and a second hinging surface opposed and parallel to said first working surface and separated therefrom by a thickness of said contiguous sheet;
    first, second, third and fourth grooves cut into said second hinging surface and subtending said contiguous sheet into first, second, third and fourth body members of relatively flat and planar geometry each having equal surface area on said second hinging surface;
    said second and third grooves further subtending said second hinging surface into a fifth body member having a surface length approximately equal to a length of said second and third grooves and a surface width approximately equal to twice said thickness of said contiguous sheet.

12. The work support surface of claim 11, further comprising an open position having said first, second, third and fourth body member working surfaces co-planar and in a storage position having said first body member working surface adjacent to said second body member working surface, said third body member working surface adjacent to said fourth body member working surface, and said first body member hinging surface adjacent to said fourth body member hinging surface.

13. The work support surface of claim 11, wherein said first working surface is contiguous and non-porous.

14. The work support surface of claim 13, wherein said polymeric material is less dense than water.

15. The work support surface of claim 11, wherein said first, second, third and fourth grooves are non-pinching and have a continuous arch in cross-section.

16. A method of constructing, using and closing a cutting board having at least four body sections, each of said at least four body sections having a work supporting surface upon which cutting may operatively be performed, comprising the steps of:

folding a first one of said at least four body section work supporting surfaces from a position generally coplanar with a second one of said at least four body section work supporting surfaces to a position immediately adjacent said second one of said at least four body section work supporting surfaces;

rotating a fourth one of said at least four body section supporting surfaces from a position generally coplanar with a third one of said at least four body section work supporting surfaces to a position immediately adjacent said third one of said at least four body section work supporting surfaces and spaced from said first body section by an amount approximately equal to the sum of a thickness of said first one of said at least four body sections and a thickness of said fourth one of said at least four body sections;

pivoting said second one of said at least four body section work supporting surfaces from a position generally coplanar with said third one of said at least four body section work supporting surfaces to a position parallel to and spaced from said third one of said at least four body section work supporting surfaces while maintaining said first one of said at least four body section work supporting surfaces adjacent said second one of said at least four body section work supporting surfaces and said fourth one of said at least four body section work supporting surfaces adjacent said third one of said at least four body section work supporting surfaces, said second one of said at least four body section work supporting surfaces separated from said third one of said at least four body section work supporting surface by said first and fourth ones of said at least four body sections.

17. The method of constructing, using and closing a cutting board of claim 16 further comprising the step of forming a polymer sheet having a primary thickness and a length and width and having first, second, third and fourth generally parallel grooves defining hinges of thickness less than said primary thickness.

18. The method of constructing, using and closing a cutting board of claim 17 wherein said forming step further comprises forming said second and third generally parallel grooves at a distance apart from each other by an amount approximately equal to twice said primary thickness, wherein said folding, rotating and pivoting steps produce a closed cutting board having said at least four body sections stacked as immediately adjacent, parallel layers.

19. The method of constructing, using and closing a cutting board of claim 18 further comprising the step of cutting upon said work supporting surface subsequent to said forming and prior to said folding, rotating and pivoting steps.

20. The method of constructing, using and closing a cutting board of claim 19 wherein said cutting step further comprises butchering.

\* \* \* \* \*